United States Patent
Zinner et al.

(10) Patent No.: US 11,665,518 B2
(45) Date of Patent: May 30, 2023

(54) METHOD FOR OPERATING AN ETHERNET ON-BOARD ELECTRICAL SYSTEM OF A MOTOR VEHICLE, CONTROL UNIT AND ETHERNET ON-BOARD ELECTRICAL SYSTEM

(71) Applicant: CONTINENTAL AUTOMOTIVE GMBH, Hannover (DE)

(72) Inventors: Helge Zinner, Munich (DE); Julian Brand, Munich (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 17/046,423

(22) PCT Filed: Apr. 3, 2019

(86) PCT No.: PCT/EP2019/058357
§ 371 (c)(1),
(2) Date: Oct. 9, 2020

(87) PCT Pub. No.: WO2019/197233
PCT Pub. Date: Oct. 17, 2019

(65) Prior Publication Data
US 2021/0120386 A1 Apr. 22, 2021

(30) Foreign Application Priority Data
Apr. 9, 2018 (DE) .......................... 102018205264.6

(51) Int. Cl.
*H04W 4/48* (2018.01)
*H04L 43/0852* (2022.01)
*H04L 67/12* (2022.01)

(52) U.S. Cl.
CPC ........... *H04W 4/48* (2018.02); *H04L 43/0852* (2013.01); *H04L 67/12* (2013.01)

(58) Field of Classification Search
CPC ....... H04W 4/48; H04L 43/0852; H04L 67/12
(Continued)

(56) References Cited

U.S. PATENT DOCUMENTS

| | | | | |
|---|---|---|---|---|
| 4,403,208 A | * | 9/1983 | Hodgson ................. | G08B 1/08 455/99 |
| 6,919,804 B1 | * | 7/2005 | Cook ....................... | G07C 9/00 340/556 |

(Continued)

FOREIGN PATENT DOCUMENTS

| | | |
|---|---|---|
| EP | 1886214 B1 | 8/2014 |
| WO | 2009057005 A2 | 5/2009 |

OTHER PUBLICATIONS

Hyung-Taek Lim et al, "Challenges in a future IP/Ethernet-based in-car network for real-time applications", Design Automation Conference (DAC), 2011 48th ACM/EDAC/IEEE, IEEE, Jun. 5, 2011 (Jun. 5, 2011), p. 7-12, XP031927722, ISBN: 9781450306362, p. 7, col. 2—p. 8, col. 1.

*Primary Examiner* — Thu Ha T Nguyen
(74) *Attorney, Agent, or Firm* — Laurence A. Greenberg; Werner H. Stemer; Ralph E. Locher

(57) ABSTRACT

A method for operating an Ethernet on-board electrical system of a motor vehicle includes determining a propagation time or delay of a first signal on a first connection path between a first control unit of the Ethernet on-board electrical system and a second control unit of the Ethernet on-board electrical system. A maximum speed of the first connection path is determined. A type of transmission medium of the first connection path is determined on the basis of the connection delay and the maximum speed. A control unit for an Ethernet on-board electrical system and an Ethernet on-board electrical system for a motor vehicle are also provided.

11 Claims, 5 Drawing Sheets

(58) Field of Classification Search
USPC .............................. 455/414.1; 709/201, 217
See application file for complete search history.

(56) References Cited

U.S. PATENT DOCUMENTS

| | | | | |
|---|---|---|---|---|
| 6,963,728 | B2* | 11/2005 | Edwards | H01P 3/12 455/99 |
| 7,076,204 | B2* | 7/2006 | Richenstein | H04H 60/04 455/142 |
| 7,711,322 | B2* | 5/2010 | Rhodes | H04B 13/02 367/904 |
| 8,391,167 | B2 | 3/2013 | Ryu et al. | |
| 8,712,408 | B2* | 4/2014 | Tsurutome | H04L 67/2814 455/99 |
| 9,110,088 | B1 | 8/2015 | Wright et al. | |
| 10,158,966 | B2* | 12/2018 | Kao | H04W 40/32 |
| 11,117,046 | B1* | 9/2021 | Denbigh | A63F 3/0052 |
| 2004/0022237 | A1* | 2/2004 | Elliott | H04L 65/401 370/356 |
| 2005/0089126 | A1* | 4/2005 | Zerbe | H04L 5/1438 375/353 |
| 2006/0083172 | A1 | 4/2006 | Jordan et al. | |
| 2006/0246910 | A1* | 11/2006 | Petermann | H04W 16/26 370/279 |
| 2007/0195765 | A1* | 8/2007 | Heissenbuttel | H04L 12/4641 370/389 |
| 2009/0310571 | A1* | 12/2009 | Matischek | H04W 4/70 370/336 |
| 2010/0189120 | A1 | 7/2010 | Diab et al. | |
| 2011/0148709 | A1 | 6/2011 | Davis et al. | |
| 2013/0343747 | A1* | 12/2013 | Sarwar | H04L 43/0852 370/252 |
| 2014/0057610 | A1* | 2/2014 | Olincy | H04W 4/16 455/414.1 |
| 2017/0038404 | A1 | 2/2017 | Wright et al. | |
| 2020/0294401 | A1* | 9/2020 | Kerecsen | G05D 1/0287 |
| 2020/0389469 | A1* | 12/2020 | Litichever | H04L 63/029 |
| 2021/0120386 | A1* | 4/2021 | Zinner | H04W 4/48 |
| 2021/0134162 | A1* | 5/2021 | Sundaramurthy | B64D 43/00 |
| 2021/0167881 | A1* | 6/2021 | Zinner | H04L 12/40 |
| 2021/0168120 | A1* | 6/2021 | Zinner | H04L 9/085 |
| 2021/0255616 | A1* | 8/2021 | Surace | G08G 5/003 |
| 2022/0046114 | A1* | 2/2022 | Entelis | H04L 69/08 |
| 2022/0089237 | A1* | 3/2022 | Sverdlov | G05B 19/41895 |
| 2022/0309932 | A1* | 9/2022 | Pokorny | G08G 5/025 |
| 2022/0309934 | A1* | 9/2022 | Panchangam | G08G 5/0082 |
| 2022/0335841 | A1* | 10/2022 | Huncha | G08G 5/0034 |
| 2022/0343094 | A1* | 10/2022 | R N | G06V 20/13 |

* cited by examiner

METHOD FOR OPERATING AN ETHERNET ON-BOARD ELECTRICAL SYSTEM OF A MOTOR VEHICLE, CONTROL UNIT AND ETHERNET ON-BOARD ELECTRICAL SYSTEM

BACKGROUND OF THE INVENTION

Field of the Invention

The invention relates to a method for operating an Ethernet on-board electrical system of a motor vehicle. The invention also relates to a control unit for a corresponding Ethernet on-board electrical system and to an Ethernet on-board electrical system having a corresponding control unit.

The control devices in a vehicle network can nowadays usually be reached only by means of an identical connection. There is usually no redundancy in the cable harness. However, in future, provision is made for control devices to be equipped with redundant power and data connections for reasons of failure safety in order to be able to still communicate in the event of a fault, for example a cable breakage or a contact fault in the connector. An automobile network, in particular an Ethernet on-board electrical system, of the future will be interconnected to a greater extent in a similar manner to a network known from other fields of information technology.

As a result, the question arises of which connection path between control units is best for which application, in particular with regard to latency, failure safety, EMC (electromagnetic compatibility) and power transmission. The information relating to the topology of the network and its speeds has previously not been available to the software or the programs in the control devices, however. However, in future, a program will be used in a very large number of different on-board electrical system variants.

SUMMARY OF THE INVENTION

The object of the invention is to provide a method, a control unit and an Ethernet on-board electrical system in which or with which an Ethernet on-board electrical system can be operated in a more reliable manner.

The object is achieved by means of a method, a control device and an Ethernet on-board electrical system according to the independent patent claims.

An Ethernet on-board electrical system of a motor vehicle is operated in accordance with a method according to the invention. The following steps are performed:
  determining a propagation time or connection delay of a first signal on a first, in particular direct, connection path between a first control unit of the Ethernet on-board electrical system and a second control unit of the Ethernet on-board electrical system;
  determining a maximum speed of the first connection path; and
  determining a type or physical medium of a transmission medium of the first connection path on the basis of the connection delay and the maximum speed.

The invention is based on the knowledge that a maximum speed of the connection path can be determined on the basis of the propagation time or delay of a signal on the connection path and the type or physical medium of the transmission medium can in turn be determined from the connection delay and the maximum speed. The Ethernet on-board electrical system can be operated in a more reliable manner with the knowledge of the transmission medium.

The type or physical medium of the transmission medium can therefore be communicated to a program or software in a control device of the Ethernet on-board electrical system, for example. On the basis thereof, the program can then decide, for example, which connection path is selected for the transmission of data; a more reliable path or a faster path can be selected, for example. It is also possible to decide, for example on the basis of the data to be transmitted, whether the data are intended to be transmitted via a more reliable path or a fast path. For example, image information which is captured live using a camera of the motor vehicle is transmitted using a fast connection rather than using a more reliable connection since the current image information is no longer relevant or is no longer of interest to the program after a certain time.

In particular, the length of the respective connection path is determined. The type of transmission medium is then additionally determined, in particular, on the basis of the length of the transmission path.

In particular, the transmission medium is determined by comparing the delay time and/or the maximum speed and/or the length with reference values, in particular with a reference delay time and/or a reference maximum speed and/or a reference length.

Data can be transmitted more efficiently by virtue of the method. With the knowledge of the type of transmission medium or the channel parameters, the program, in particular an application program, an operating system or firmware, can be optimized or designed with respect to memory usage, real-time capability and any security levels. If it is identified, for example, that transmission is carried out via an optical medium instead of a copper medium, the separate expenditure for complying with the security requirements can be minimized since the "optical" class has better properties with respect to electromagnetic interference. This results in a lower power consumption since the worst case scenario is usually assumed at the time of creating the design and more computing power than necessary is therefore planned as a precaution.

A further advantage is the better use of resources by the method. Depending on the transmission medium and the speed, the program can keep resources free or can allocate them in good time if it is identified, for example, that a new transmission would be possible in terms of time on account of the speed or would not be possible, that is to say a new transmission would still be possible within the defined maximum transmission time on account of the faster speed. Depending on the medium, the respective control unit or controller could therefore even save energy and could be clocked down or could provide resources for other applications or programs. If a higher transmission speed is identified, for example, algorithms of camera sensors, for example, can possibly be optimized to not carry out compression, for example, since this costs time and quality, but rather to generate data with the best quality. For example, it is possible to transmit raw data if a 10 Gbit/s Ethernet connection is identified, for example. Any latency which would arise during compression and decompression would then be dispensed with.

Fail-safe communication is also advantageous. Depending on the medium, the redundancy of the software or of the program or the data transmission can be adapted. If slow Ethernet, for example 100 Mbit/s, via copper is identified, for example, further methods for redundancy could be activated in order to increase the probability of successful data transmission. If, for example, 10 Gbit/s instead of 100 Mbit/s Ethernet is identified, double transmission via redundant paths is possibly not required since the data can be retransmitted in the event of a fault. This means that less bandwidth must be kept available in the network, that is to say power can also be saved.

It is also an advantage that platform-independent software can be used, for example. As a result of the method, the program can be tailored in a more flexible and precise manner to the requirements of the application, for example. If an application is nowadays developed for 100 Mbit/s, for example, it can also be used in an Ethernet on-board electrical system which has a higher data rate since the program can be adapted in accordance with the method according to the invention.

Provision is preferably made for the type or physical medium of the transmission medium to be communicated to a program in the Ethernet on-board electrical system and for a connection path selection of the program to be adapted on the basis of the type of transmission medium. The type of transmission medium can either be communicated to the program or the program itself finds out the type of transmission medium by means of the method according to the invention. With knowledge of the transmission medium, the program can then adapt a previously made connection path selection or can determine it for the first time. In this case, the program runs, for example, in the first control unit, in the second control unit or in various ways in the Ethernet on-board electrical system.

Provision is also preferably made for the type of transmission medium to be defined as optical, copper or wireless. Defining the transmission medium as optical, copper or wireless means that the transmission medium is assigned to a predetermined class. At least one predetermined property can then be assigned to each of these classes, for example. For example, optical may represent a low latency or a high speed. A higher latency can be assigned to the wireless class than to the other two classes, for example.

Provision is preferably also made for a transmission reliability value, which describes a loss probability of data transmitted via the first connection path, to be assigned to the first connection path on the basis of the type of transmission medium. As a result of the transmitted reliability value, the program is spared from itself determining the property of the transmission medium. In addition to the type of transmission medium, the transmission reliability value can therefore also be communicated to the program, for example, and the program can immediately process the transmission reliability value further and can adapt the connection path selection without the type of transmission medium having to be evaluated.

Provision is preferably also made for delays of a plurality of signals on the first connection path to be determined and for the shortest delay of the plurality of signals to be selected, wherein the maximum speed of the first connection path is determined on the basis of the shortest delay. Alternatively or additionally, propagation times of a plurality of signals on the first connection path can be determined and the fastest propagation time of the plurality of signals is selected, wherein the maximum speed of the first connection path is determined on the basis of the fastest propagation time. The delays or propagation times of the plurality of signals have the advantage that a plurality of measurements result in increased reliability. For example, it may be the case that only a single measurement with a single signal results in the type of transmission medium being incorrectly determined. The maximum speed and therefore the type or physical medium of the transmission medium can be determined again in a more reliable manner by means of the plurality of signals.

Provision is preferably also made for a delay time or propagation time of a second signal on a second, in particular direct, connection path, which differs from the first connection path, between the first control unit and the second control unit to be determined, and for a maximum speed of the second connection path to be determined, wherein the type of transmission medium of the second connection path is determined on the basis of the delay time or propagation time and maximum speed of the second connection path. In this case, the second connection path is preferably an alternative connection path to the first connection path. It is advantageous that the type or physical medium of the transmission medium is now respectively determined from the first connection path and the second connection path. The respective types of transmission medium are then again communicated to the program and the program can select the first connection path and/or the second connection path for the transmission of data depending on the type or physical medium of the transmission medium. It may also be the case that the program changes the connection paths or adds or omits a further connection path during the transmission of data.

Provision is preferably also made for the method to be carried out, in particular again, after a change of the first control unit and/or the second control unit from a normal operating mode into an energy-saving mode and/or from the energy-saving mode into the normal operating mode. In the case of different operating modes in particular, that is to say in the normal operating mode and in the energy-saving mode in the present case, the maximum speed of the respective connection path is changed. For example, it may be the case that the maximum speed is lower in the energy-saving mode than in the normal operating mode.

Provision is also made for the propagation time or connection delay of the first signal to be determined using the first control unit and for a propagation time or connection delay of a third signal on a third connection path, which is connected only indirectly to the first control unit, between the second control unit and a third control unit of the Ethernet on-board electrical system to be determined using the third control unit, wherein the determination of the connection delay or propagation time of the third signal is triggered by means of a service message transmitted from the first control unit to the third control unit. It is thus advantageous that the third control unit can therefore be requested to determine the connection delay by the first control unit. The third control unit therefore need not itself be configured to initiate or trigger the determination of the connection delay at a particular time or on the basis of a particular criterion. It is also advantageous that a plurality of control units in the Ethernet on-board electrical system are configured to determine connection delays. The connection delay can be determined in a more reliable manner as a result.

The invention also comprises a control unit for an Ethernet on-board electrical system. The control unit, as a first control unit, is designed to carry out the following steps:
    to transmit a signal to a second control unit of the Ethernet on-board electrical system and to receive the signal from the second control unit;
    to determine a propagation time or delay of the signal on a connection path, in particular a direct connection path, to the second control unit;

to determine a maximum speed of the connection path; and to determine a transmission medium of the connection path on the basis of the connection delay and the maximum speed.

In this case, the control unit may be in the form of a versatile control unit of the Ethernet on-board electrical system of the motor vehicle. The control unit can therefore at least partially undertake functions of a driver assistance device of the motor vehicle, for example, or may be designed to control an actuator or may only be in the form of a network switch. The control unit may also be a communication control unit, for example, which is designed for communication inside the vehicle or for communication outside the vehicle.

The invention also comprises an Ethernet on-board electrical system for a motor vehicle, having a first control unit and a second control unit, wherein the control units are connected to one another via at least one connection path, in particular directly at least on one connection path, and the first control unit is designed in accordance with the control unit according to the invention.

In the present case, directly means that no further control unit is arranged between the first control unit and the second control unit.

The Ethernet on-board electrical system is arranged in a motor vehicle, in particular. Data can be transmitted from a first control device in the Ethernet on-board electrical system to a second control device in the Ethernet on-board electrical system via the Ethernet on-board electrical system. The Ethernet on-board electrical system in the motor vehicle is therefore designed, in particular, to transmit data in the motor vehicle.

Provision is preferably made for the Ethernet on-board electrical system to have a third control unit which is only indirectly connected to the first control unit and is directly connected to the second control unit via a third connection path, wherein the third control unit is designed to determine a delay or propagation time of a third signal on the third connection path, wherein the first control unit is designed to trigger the determination of the connection delay of the third signal by means of a service message to the third control unit.

The preferred embodiments and their advantages presented with respect to the method according to the invention accordingly apply to the control unit according to the invention and to the Ethernet on-board electrical system according to the invention. The concrete features of the control unit and of the Ethernet on-board electrical system are designed to cooperate when carrying out the method according to the invention.

Further features of the invention emerge from the claims, the figures and the description of the figures.

Exemplary embodiments of the invention will be explained in more detail below on the basis of schematic drawings.

DETAILED DESCRIPTION OF THE INVENTION

In the figures, identical or functionally identical elements are provided with identical reference signs.

Figure 1:
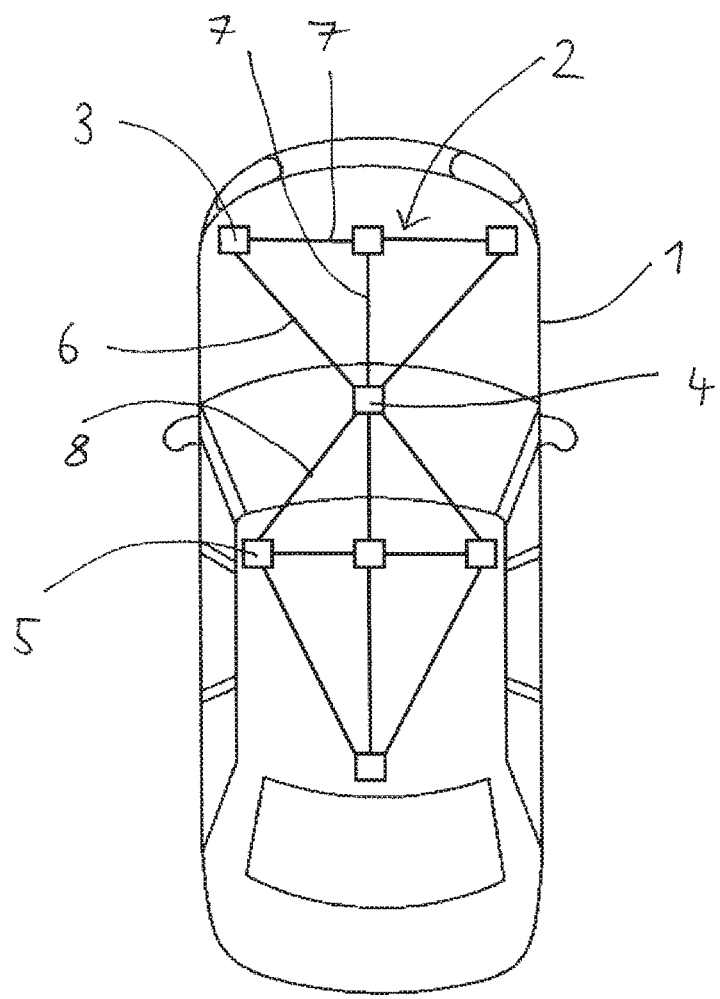
FIG. 1 shows a schematic plan view of a motor vehicle having an exemplary embodiment of an Ethernet on-board electrical system according to the invention.

FIG. 1 shows a plan view of a motor vehicle 1. The motor vehicle 1 has an Ethernet on-board electrical system 2. The Ethernet on-board electrical system 2 in turn has, according to the exemplary embodiment, a plurality of control units which can also be referred to as control apparatuses or control devices. In this case, the control units are connected to one another using connection paths. On account of the existing topology of the Ethernet on-board electrical system 2 in the exemplary embodiment, there are a plurality of communication paths between the control units. The connection paths can be formed from different media types or materials, for example.

With an increase in the number of Ethernet variants, the dynamic change in the connection speed will also be used, for example. This means, for example, that the speed can be changed at runtime. For example, a 10 Gbit/s connection path can be changed to 100 Mbit/s so that energy is saved. Since this is a dynamic function, it may be the case that the on-board electrical system has a different design after delivery or after initial installation in the motor vehicle than after a software update or in a fault situation, for instance.

The Ethernet on-board electrical system 2 has a first control unit 3, a second control unit 4 and a third control unit 5. The first control unit 3 is connected to the second control unit 4 by means of a first connection path 6. Furthermore, the first control unit 3 according to the exemplary embodiment is also connected to the second control unit 4 by means of a second connection path 7.

The first control unit 3, the second control unit 4 and/or the third control unit 5 may be in the form of a control device or a network switch, for example.

The second control unit 4 and the third control unit 5 are connected to one another by means of a third connection path 8.

According to the exemplary embodiment from FIG. 1, the first control unit 3 and the second control unit 4 are directly connected to one another via the first connection path 6, whereas the first control unit 3 and the second control unit 4 or only indirectly connected using the second connection path 7 since the second connection path 7 is divided into two parts by a further control unit. According to another exemplary embodiment, however, the second connection path 7 can also directly connect the first control unit 3 and the second control unit 4 to one another.

Figure 2:
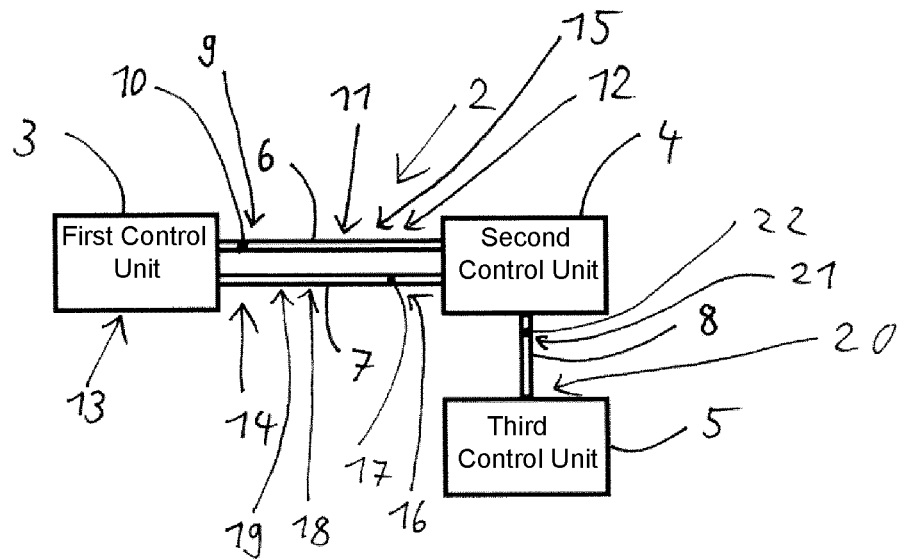
FIG. 2 shows a schematic illustration of the Ethernet on-board electrical system having a first control unit, a second control unit and a third control unit which are connected using a first connection path, a second connection path and a third connection path.

FIG. 2 shows a further exemplary embodiment of the Ethernet on-board electrical system 2. The Ethernet on-board electrical system 2 has the first control unit 3, the second control unit 4 and the third control unit 5. Furthermore, the Ethernet on-board electrical system 2 also has the first connection path 6, the second connection path 7 and the third connection path 8.

According to the exemplary embodiment, a propagation time or delay 9 of a first signal 10 on the first connection path 6 is determined. The propagation time or delay 9 describes the length of time for which the first signal 10 has been in transit, via the first connection path 6, from the first control unit 3 to the second control unit 4 or vice versa.

A maximum speed 11 of the first connection path 6 is determined on the basis of the propagation time or delay 9 of the first signal 10. The maximum speed 11 of the first connection path 6 varies in this case depending on the length of the cable, the transmission speed and/or the media type or the type of transmission medium, for example.

A type of transmission medium 12 of the first connection path 6 is determined on the basis of the maximum speed 11.

According to the exemplary embodiment, the type of transmission medium 12 is defined as optical, copper or wireless. In the case of optical, the first connection path 6 is in the form of an optical fiber connection, for example. In the case of copper, the first connection path is formed, for example, by cables with twisted pairs of wires, for example an unshielded twisted pair (UTP) cable. In the case of wireless, the first connection path 6 is substantially in the form of a radio path and the first control unit 3 and/or the second control unit 4 has/have a radio receiver and/or a radio transmitter or is/are connected thereto.

The type or physical medium of the transmission medium 12 is communicated to a program 13 in the Ethernet on-board electrical system 2. The program 13 may be present, for example, in the first control unit 3, the second control unit 4 or the third control unit 5 or a further control unit of the Ethernet on-board electrical system 2. A connection path selection 14 is adapted depending on the type or physical medium of the transmission medium 12. By virtue of the connection path selection 14 for example, the program 13 can therefore transmit data via another connection path than before the connection path selection. However, the program 13 can also interrupt the transmission of data by the connection path selection 14, for example, and can resume the transmission of data at a later time.

According to the exemplary embodiment, a transmission reliability value 15 is assigned to the first connection path 6 on the basis of the transmission medium 12. The transmission reliability value describes a loss probability of data transmitted via the connection path. The transmission reliability value 15 therefore permits a statement on how reliably the data can be transmitted via the first connection path. If a reliability limit value is undershot, for example, and the data can be transmitted only unreliably, it can be expected that the data will reach their destination with a delay or, if it is not worthwhile to transmit the data again on account of the required up-to-dateness of the data, will not reach their destination at all.

According to a further exemplary embodiment, delays of a plurality of signals on the first connection path 6 are determined and the shortest delay of the plurality of signals is selected. The maximum speed 11 of the first connection path 6 is then determined on the basis of the shortest delay.

In a similar manner to the procedure described above, the type or physical medium of the transmission medium 12 can also be determined for the second connection path 7 and/or the third connection path 8.

Provision may therefore also be made for a propagation time or delay 16 of a second signal 17 on the second connection path 7 to be determined. A maximum speed 18 of the second connection path 7 is then determined on the basis of the propagation time or delay 16 of the second signal 17. The transmission medium 19 of the second connection path 7 is in turn determined on the basis of the maximum speed 18 of the second connection path 7.

Both the first control unit 3 and the second control unit 4 and also the third control unit 5 can be operated in a normal operating mode or in an energy-saving mode. In the energy-saving mode, the respective control unit consumes less energy than in the normal operating mode. For example, in the energy-saving mode, the speed of a port of the respective control unit can be reduced in comparison with the speed in the normal operating mode. The reduced speed of the port then also affects the respective maximum speed of the respective connection path.

According to a further exemplary embodiment, a service message 20 can be transmitted from the first control unit 3 to the third control unit 8. The service message 20 then triggers the determination of a propagation time or delay 21 of a third signal 22. The third signal 22 is transmitted between the second control unit 4 and the third control unit 5. The propagation time or delay 21 of the third signal 22 is determined by the third control unit 5 according to the exemplary embodiment.

Figure 3:
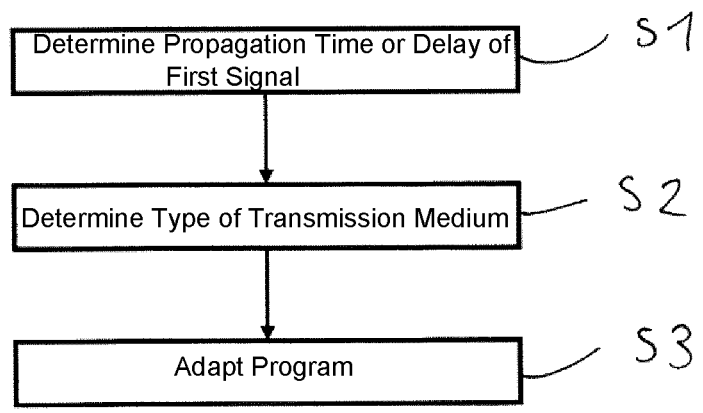
FIG. 3 shows a flowchart for determining a type of transmission medium of the respective connection path.

FIG. 3 generally describes the method. In a step S1, the propagation time or delay 9 of the first signal 10 is determined. In a step S2, the type of transmission medium 12 is determined. In a step S3, the program 13 is finally adapted.

Figure 4:
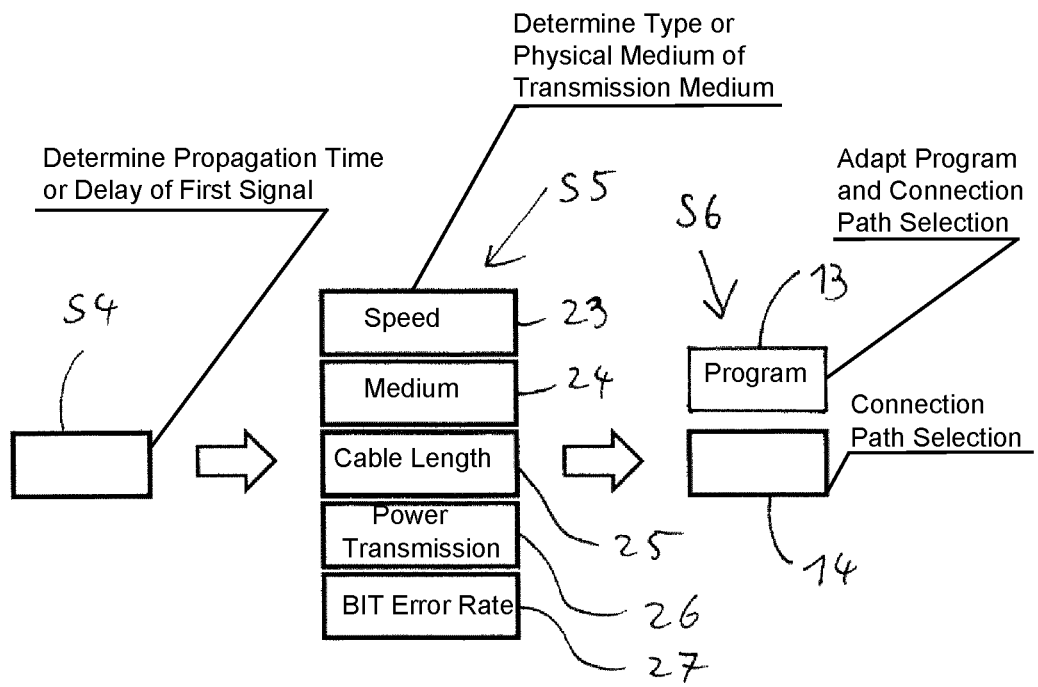
FIG. 4 shows a flowchart for adapting a program in the Ethernet on-board electrical system.

FIG. 4 shows a flowchart for calculating the respective parameters or the respective parameters which are assigned to the transmission medium 12. In a step S4, the propagation time or delay 9 of the first signal 10 is determined. As a result, the type or physical medium of the transmission medium 12 can be determined in a step S5. The type of transmission medium 10 may in turn comprise the following parameters: speed 23, medium 24, cable length 25, power transmission 26, bit error rate 27. In a step S6, the adaptation of the program 13 and the connection path selection 14 then finally follow.

According to the exemplary embodiment, it is proposed to measure the connection delay of the signals between connected control units or controllers. Methods of the IEEE 1588 or IEEE 802.1AS standard (called "link delay" there) can be used, for example, to measure the delays 9, 16 and 21. TTEthernet (time triggered Ethernet) can also provide methods for determining the respective propagation time or delay 9, 16 and 21, for example.

Figure 5:
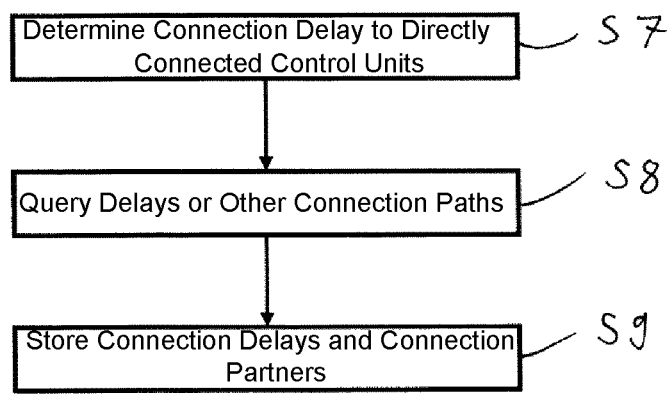
FIG. 5 shows a flowchart for determining and storing a propagation time or connection delay of a signal.

FIG. 5 shows the determination of the respective propagation time or delay 9, 16 and 21. A local query and a non-local query of the connection delay are described. The program 13 which is executed, in particular, on at least one control unit preferably locally first determines the local delay or the delays if more than one control device is directly connected. Other control units are then preferably queried via a service-oriented method, for example SOME/IP (Scalable Service-Oriented Middleware over IP) with respect to their connection delay to the neighbor. This can be implemented either centrally or in a decentralized manner. The query can be carried out either once, during the system start, definition or after a software update, or can be carried out cyclically in order to detect dynamic changes. These data are then stored and assigned for the first time, in particular including the addresses of the control units.

In a step S7, the respective connection delay to the directly connected control units is determined. In a step S8, the respective delays of other connection paths are queried.

In a step S9, the respective connection delays and their associated connection partners are stored.

Figure 6:
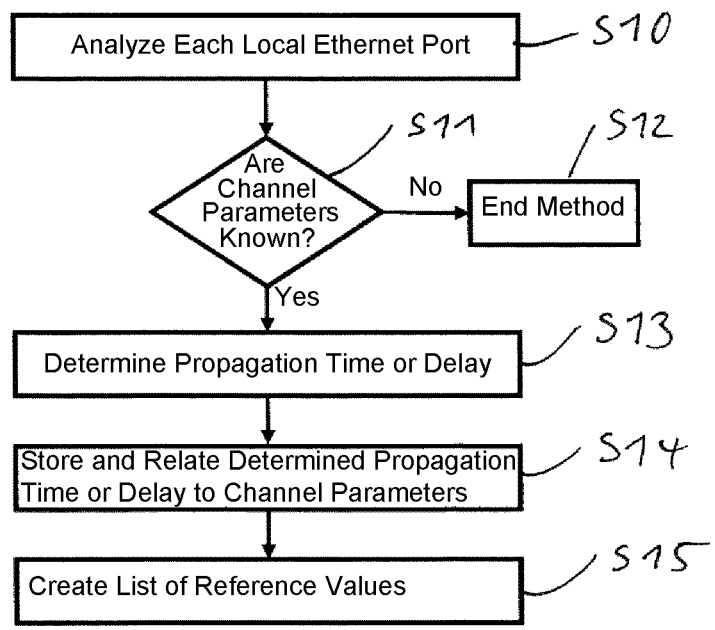
FIG. 6 shows a flowchart for creating a list of reference values of propagation times or connection delays.

FIG. 6 shows a further method for deriving the other speeds on the basis of a reference measurement. If, for example, the current temperature is very high or poor cables are used, prestored values may possibly be too inaccurate. It is therefore proposed that the application or the program 13 itself carries out measurements on its own control unit, in particular with knowledge of its own parameters and other speeds which can then be derived or calculated therefrom.

In a step S10, an analysis is carried out for each local Ethernet port. In a step S11, it is queried whether channel parameters are known. If this is not the case, a step S12 follows and the method is ended. If this is the case, a step S13 follows in which the respective propagation time or delay 9, 16 and 21 is determined. In a step S14, storage is carried out and the determined propagation time or delay is related to the channel parameters. In a step S15, a list of reference values is created.

Figure 7:
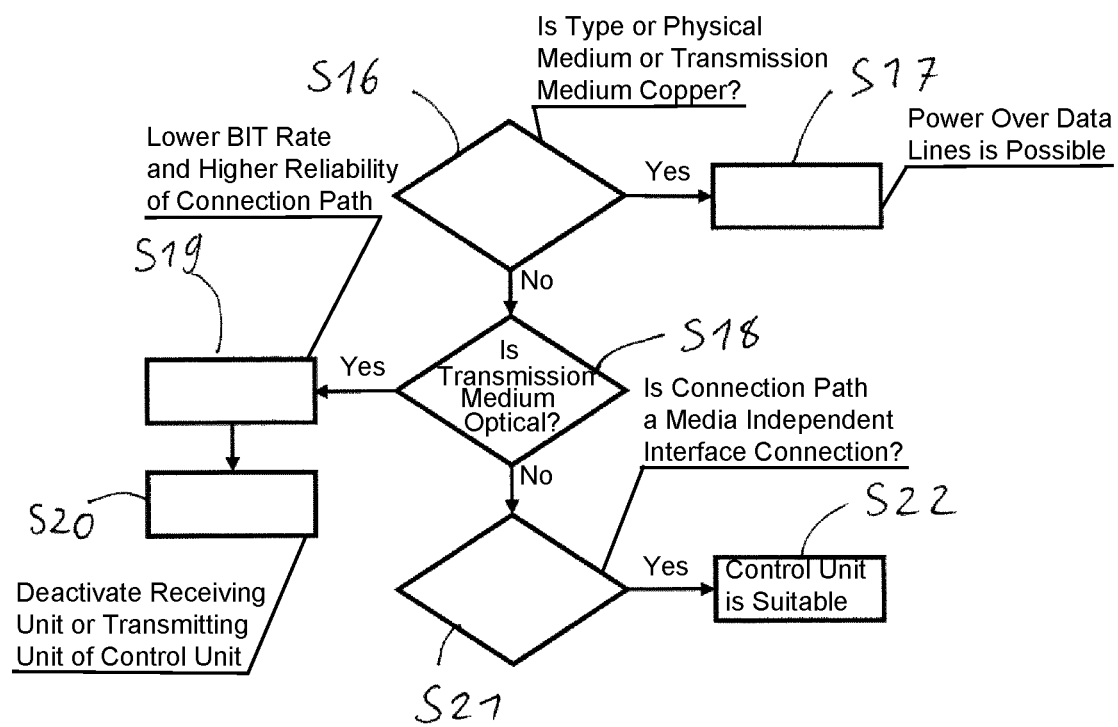
FIG. 7 shows a flowchart for adapting a program in the Ethernet on-board electrical system in an exemplary manner.

FIG. 7 shows possible optimization by means of knowledge of the type of transmission medium 12, 19. In a step S16, it is decided whether the type or physical medium of the transmission medium 12, 19 is copper. If this is the case, a step S17 follows in which it is confirmed that PoDL (Power over Data Lines), that is to say power supply via Ethernet, is possible.

If it is decided in step S16 that the medium is not copper, a step S18 follows. Step S18 checks whether the transmission medium 12 is optical. If this is the case, a step S19 follows. Step S19 determines that there is a lower bit error rate as a result and there is a higher reliability of this connection path as a result. In a step S20, it is possible to deactivate RX (receiving unit) or TX (transmitting unit) of the control unit 3, 4, 5 if it is not required.

If it is decided in step S18 that the medium or the type of transmission medium 12 is not optical, it is assumed in a step S21 that the respective connection path, that is to say the relevant connection path, is in the form of a direct MII (Media Independent Interface) connection. In this case, the respective control unit is suitable, for example, for IEEE P802.1CB (Frame Replication and Elimination for Redundancy).

Further possibilities emerge from the knowledge of the transmission speed. Combined with the current data streams, data can be deliberately transmitted via a high bandwidth connection, for example, and other connection paths which are not required can therefore be deactivated, thus making it possible to save energy.

In addition, it is possible in the case of high bandwidth connections to use redundancy mechanisms (for example IEEE 802.1CB). Since the data are continuously transmitted in a redundant manner in this case, a high bandwidth is required for this purpose. It is also conceivable to adapt the application depending on the speed of the transmission path. A camera can adapt the resolution of the image data to be transmitted depending on the speed of the link or connection path 6, 7, 8, for example.

LIST OF REFERENCE SIGNS

1 Motor vehicle
2 Ethernet on-board electrical system
3 First control unit
4 Second control unit
5 Third control unit
6 First connection path
7 Second connection path
8 Third connection path
9 Delay of the first signal
10 First signal
11 Maximum speed of the first connection path
12 Type of transmission medium of the first connection path
13 Program
14 Connection path selection
15 Transmission reliability value
16 Delay of the second signal
17 Second signal
18 Maximum speed of the second connection path
19 Type of transmission medium of the second connection path
20 Service message
21 Delay of the third signal
22 Third signal
23 Speed
24 Medium
25 Cable length
26 Power transmission
27 Bit error rate

The invention claimed is:

1. A method for operating an Ethernet on-board electrical system of a motor vehicle, the method comprising:
   determining a connection delay of a first signal on a first connection path between a first control unit of the Ethernet on-board electrical system and a second control unit of the Ethernet on-board electrical system;
   determining a maximum speed of the first connection path based on the connection delay; and
   determining a type or physical medium of a transmission medium of the first connection path based on the connection delay and the maximum speed.

2. The method according to claim 1, which further comprises communicating a type of the transmission medium to a program in the Ethernet onboard electrical system and adapting a connection path selection of the program based on the transmission medium.

3. The method according to claim 1, which further comprises providing a transmission reliability value describing a loss probability of data transmitted via the first connection path, and assigning the transmission reliability value to the first connection path based on the transmission medium.

4. The method according to claim 1, which further comprises determining delays of a plurality of signals on the first connection path, selecting a shortest delay of the plurality of signals, and determining the maximum speed of the first connection path based on the shortest delay.

5. The method according to claim 1, which further comprises:
   providing a second connection path between the first control unit and the second control unit, the second connection path being different from the first connection path;
   determining a delay of a second signal on the second connection path;
   determining a maximum speed of the second connection path; and
   determining a transmission medium of the second connection path based on the delay and the maximum speed of the second connection path.

6. The method according to claim 5, which further comprises:
   providing a third control unit of the Ethernet on-board electrical system;

providing a third connection path connected indirectly to the first control unit and connected between the second control unit and the third control unit;

determining a connection delay of the first signal by using the first control unit and determining a delay of a third signal on the third connection path by using the third control unit; and triggering the determination of the connection delay of the third signal by using a service message transmitted from the first control unit to the third control unit.

7. The method according to claim 1, which further comprises carrying out the method after at least one of a change of the first control unit from a normal operating mode into an energy-saving mode or a change from the energy-saving mode into the normal operating mode.

8. A method for operating an Ethernet on-board electrical system of a motor vehicle, the method comprising:

determining a connection delay of a first signal on a first connection path between a first control unit of the Ethernet on-board electrical system and a second control unit of the Ethernet on-board electrical system;

determining a maximum speed of the first connection path based on the connection delay; and determining a type or physical medium of a transmission medium of the first connection path based on the connection delay and the maximum speed, wherein the determined type or physical medium of the transmission medium is selected from the group consisting of optical, copper or wireless.

9. A control unit for an Ethernet on-board electrical system, the control unit comprising a first control unit configured:

to transmit a signal to a second control unit of the Ethernet on-board electrical system and to receive the signal from the second control unit;

to determine a connection delay of the signal on a connection path to the second control unit;

to determine a maximum speed of the connection path based on the connection delay; and to determine a type or physical medium of a transmission medium of the connection path based on the connection delay and the maximum speed.

10. An Ethernet on-board electrical system for a motor vehicle, the Ethernet on-board electrical system comprising:

a first control unit configured:
to transmit a signal to a second control unit of the Ethernet on-board electrical system and to receive the signal from the second control unit;
to determine a connection delay of the signal on a connection path to the second control unit;
to determine a maximum speed of the connection path based on the connection delay; and
to determine a type or physical medium of a transmission medium of the connection path based on the connection delay and the maximum speed;

a second control unit; and at least one connection path interconnecting the first and second control units.

11. The Ethernet on-board electrical system according to claim 10, which further comprises:

a third control unit of the Ethernet on-board electrical system, the third control unit being indirectly connected to the first control unit;

a third connection path directly connecting the third control unit to the second control unit;

the third control unit configured to determine a delay of a third signal on the third connection path; and the first control unit configured to trigger the determination of the connection delay of the third signal by using a service message sent to the third control unit.

* * * * *